(12) United States Patent
Yamanaka et al.

(10) Patent No.: US 9,993,998 B2
(45) Date of Patent: Jun. 12, 2018

(54) RESIN-COATED METAL SHEET FOR CONTAINERS AND METHOD FOR MANUFACTURING THE SAME

(71) Applicant: JFE STEEL CORPORATION, Tokyo (JP)

(72) Inventors: Yoichiro Yamanaka, Tokyo (JP); Junichi Kitagawa, Fukuyama (JP); Hiroki Nakamaru, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days. days.

(21) Appl. No.: 15/117,877

(22) PCT Filed: Feb. 17, 2015

(86) PCT No.: PCT/JP2015/000717
§ 371 (c)(1),
(2) Date: Aug. 10, 2016

(87) PCT Pub. No.: WO2015/125459
PCT Pub. Date: Aug. 27, 2015

(65) Prior Publication Data
US 2017/0008256 A1    Jan. 12, 2017

(30) Foreign Application Priority Data

Feb. 21, 2014  (JP) .................................. 2014-031206
Sep. 11, 2014  (WO) .................. PCT/JP2014/004712

(51) Int. Cl.
*B32B 15/09*   (2006.01)
*B32B 27/08*   (2006.01)
(Continued)

(52) U.S. Cl.
CPC ................ *B32B 15/09* (2013.01); *B05D 7/14* (2013.01); *B05D 7/54* (2013.01); *B32B 27/08* (2013.01);
(Continued)

(58) Field of Classification Search
None
See application file for complete search history.

(56) References Cited

U.S. PATENT DOCUMENTS 3,891,471 A    6/1975 Summers et al.
2003/0031859 A1  2/2003 Sinsel et al.
(Continued)

FOREIGN PATENT DOCUMENTS

CN    1646638 A    7/2005
CN    103068570 A   4/2013
(Continued)

OTHER PUBLICATIONS

International Search Report and Written Opinion for International Application No. PCT/JP2015/000717, dated May 19, 2015, 6 pages.

(Continued)

*Primary Examiner* — Tahseen N Khan
(74) *Attorney, Agent, or Firm* — RatnerPrestia (57) ABSTRACT

Provided is a resin-coated metal sheet for containers having a resin layer (A) on a side of the metal sheet, the side being a side that will serve as a container inner surface when the metal sheet is formed into a container. The resin layer (A) has a polyester-based multilayer structure. The resin layer (A) contains 85 mol % or more of terephthalic acid. The resin layer (A) includes at least two layers, and an uppermost resin layer (a1), which is to be in contact with contends, contains 0.10 to 2.0 mass % of a wax compound with respect to the uppermost resin layer (a1). The maximum value of the Raman band intensity ratio ($I_{1720}/I_{1615}$) when measured for
(Continued)

the cross section of the uppermost resin layer (a1) by using a laser polarization plane parallel to the surface of the resin layer (a1) is in the range of 0.45 or more and 0.80 or less. The uppermost resin layer (a1) has a thickness of 0.5 μm or more and 10 μm or less. The resin layer (A) excluding the uppermost resin layer (a1) has a thickness of 5 μm or more and 20 μm or less.

14 Claims, 1 Drawing Sheet

(51) Int. Cl.
 *B65D 25/14* (2006.01)
 *B32B 37/10* (2006.01)
 *B05D 7/14* (2006.01)
 *B05D 7/00* (2006.01)
(52) U.S. Cl.
 CPC .............. *B32B 37/10* (2013.01); *B65D 25/14* (2013.01); *B05D 2202/10* (2013.01); *B05D 2252/10* (2013.01); *B32B 2311/30* (2013.01); *B32B 2367/00* (2013.01); *B32B 2439/00* (2013.01)

(56) References Cited

U.S. PATENT DOCUMENTS

| | | | |
|---|---|---|---|
| 2005/0129964 A1 | 6/2005 | Hugo | |
| 2006/0172100 A1 | 8/2006 | Hu et al. | |
| 2007/0036995 A1* | 2/2007 | Suzuki | B32B 1/02 428/458 |
| 2007/0142615 A1* | 6/2007 | Crawford | C08G 63/199 528/272 |
| 2008/0261063 A1* | 10/2008 | Yamanaka | B32B 15/08 428/483 |
| 2010/0112302 A1 | 5/2010 | Holzmuller et al. | |
| 2013/0224413 A1* | 8/2013 | Prouvost | C08J 7/047 428/35.8 |
| 2016/0031601 A1 | 2/2016 | Prouvost et al. | |

FOREIGN PATENT DOCUMENTS

| | | |
|---|---|---|
| CN | 103154163 A | 6/2013 |
| DE | 10204829 C1 | 7/2003 |
| DE | 102007015393 A1 | 10/2008 |
| EP | 1625934 A1 | 2/2006 |
| EP | 1688188 A1 | 8/2006 |
| EP | 1757439 A1 | 2/2007 |
| JP | 2001328204 | 11/2001 |
| JP | 2007055687 | 3/2007 |
| JP | 2007253453 | 10/2007 |
| JP | 2008188918 | 8/2008 |
| WO | 2004103697 A1 | 12/2004 |
| WO | 2005115744 A1 | 12/2005 |
| WO | 2008116510 A1 | 10/2008 |
| WO | 2013030972 | 3/2015 |
| WO | 2013157379 | 12/2015 |

OTHER PUBLICATIONS

Australian Examination Report for Australian Application No. 2015220288 dated May 12, 2017, 3 Pages.
Chinese Office Action with partial English language translation for Application No. 201580009284.3, dated Apr. 25, 2017.
Supplementary European Search Report for Application No. 15751613.9, dated Feb. 22, 2017.

* cited by examiner

RESIN-COATED METAL SHEET FOR CONTAINERS AND METHOD FOR MANUFACTURING THE SAME

CROSS-REFERENCE TO RELATED APPLICATIONS

This is the U.S. National Phase application of PCT/JP2015/000717, filed Feb. 17, 2015, which claims priority to Japanese Patent Application No. 2014-031206, filed Feb. 21, 2014, and PCT/JP2014/004712, filed Sep. 11, 2014, the disclosures of each of these applications being incorporated herein by reference in their entireties for all purposes.

FIELD OF THE INVENTION

The present invention relates to a resin-coated metal sheet for containers that is used for, for example, can bodies and lids of food cans, and to a method for manufacturing the resin-coated metal sheet for containers.

BACKGROUND OF THE INVENTION

Conventionally, metal sheets formed of tin-free steel (TFS), aluminum, or the like, which are metal can materials used for food cans, have been painted to improve corrosion resistance, durability, weather resistance, and the like. However, the painting technique has problems of a complex baking process, a long treatment time, and a large amount of solvent discharged.

To solve these problems, such painted metal sheets have been replaced by resin-coated metal sheets obtained by laminating a thermoplastic resin film on a heated metal sheet. Currently, resin-coated metal sheets are widely used mainly as materials for beverage cans in the industrial field.

However, the use of resin-coated metal sheets in food can applications causes a problem in that it is difficult to take contents out of a container because the contents strongly adhere to the inner surface of the container when the contents are taken out of the container. Since this problem closely relates to consumer purchasing intention, it is very important to solve this problem in order to increase consumer purchasing intention. However, there are very few studies on an improvement in content release property for conventional resin-coated metal sheets.

The inventors of the present invention have diligently carried out studies to obtain a content release property. As a result, the inventors have found that a good content release property for contents containing a large amount of fatty components (e.g., mixtures of meats, eggs, and carbohydrates) can be obtained by adding a particular wax to a polyester resin such that the particular wax is present on the surface of the resin. Therefore, the inventors have filed Patent Literature 1.

The inventors have filed Patent Literatures 2 and 3 as a result of subsequent studies in which improvements have also been made in order to obtain a good content release property for contents having a high protein content (such as luncheon meat) and strong adhesiveness.

CITATION LIST

Patent Literature

PTL 1: Japanese Unexamined Patent Application Publication No. 2001-328204

PTL 2: Japanese Unexamined Patent Application Publication No. 2007-55687

PTL 3: Japanese Unexamined Patent Application Publication No. 2008-188918

SUMMARY OF THE INVENTION

However, the technique described in Patent Literature 1 may be insufficient to obtain a good content release property for contents having a high protein content, such as luncheon meat and tuna, because of their strong adhesiveness.

The technique described in Patent Literature 2 ensures a good release property for contents having a high protein content and strong adhesiveness. However, in order to stably obtain good performance, it is necessary to add a low-energy material containing many hydrophobic groups in an amount of about 10 to 25 mass % to a resin layer which comes into contact with the contents. Since it is necessary to use a comparatively large amount of additive agent, there is a limitation on the chemical composition of the resin layer, and it is necessary to form plural resin layers. Therefore, since mismatching among the resin layers is inevitable, there is room for improvement in the adhesiveness among the layers.

In the technique described in Patent Literature 3, there are multiple resin layers as in Patent Literature 2. A good content release property is obtained by adding 15 to 20 mass % of a fatty acid amide to the uppermost resin layer which comes into contact with the contents. There is room for improvement in adhesion between the resin layers.

The present invention has been made in order to solve the above-mentioned problems. An object of the present invention is to provide a resin-coated metal sheet for containers that has a good release property for various contents and can stably satisfy various properties required for container materials, and to provide a method for manufacturing the resin-coated metal sheet for containers.

The inventors have diligently carried out studies to solve the above-mentioned problems. As a result, the inventors focus on a resin layer (A) of a resin-coated metal sheet for containers. The resin layer (A) is to be located on the container inner surface side after container formation. The inventors have found that a resin-coated metal sheet for containers that satisfies a good content release property and other required properties (e.g., adhesion, formability, and corrosion resistance) is obtained by adding a wax compound to an uppermost resin layer (a1), which is to be in contact with contents, in the resin layer (A) and controlling the crystal structure of the uppermost resin layer (a1).

The present invention has been completed on the basis of the above findings. The gist of the present invention includes the following.

[1] A resin-coated metal sheet for a container including a metal sheet and a resin layer (A) having a multilayer structure containing polyester as a main component on an inner-surface side of the container when the metal sheet is formed into a container, wherein
1) the resin layer (A) contains terephthalic acid in an amount of 85 mol % or more,
2) the resin layer (A) includes at least two layers, and an uppermost resin layer (a1), which is to be in contact with contents, contains a wax compound in an amount of 0.10 to 2.0 mass % with respect to the uppermost resin layer (a1),
3) a maximum value of a Raman band intensity ratio ($I_{1720}/I_{1615}$) when measured for a cross section of the uppermost resin layer (a1) by using a laser polarization plane parallel to the surface of the resin layer (a1) is in a range from 0.45 to 0.80, 4) the uppermost resin layer (a1) has a thickness of 0.5 μm or more and 10 μm or less, 5) the resin layer (A) excluding the uppermost resin layer (a1) has a thickness of 5 μm or more and 20 μm or less.

[2] The resin-coated metal sheet for containers according to [1] described above, wherein the wax compound contains carnauba wax.

[3] The resin-coated metal sheet for a container according to [1] or [2] described above, further including a resin layer (B) having a multi-layer structure containing polyester as a main component on an outer-surface side of the container when the metal sheet is formed into a container, wherein the resin layer (B) which is the resin layer (B) excluding an uppermost layer, contains titanium dioxide or a disazo organic pigment as a color pigment.

[4] The resin-coated metal sheet for containers according to [3] described above, wherein a resin in the resin layer (b1) is a composition derived by mixing a polyester (1) containing a polyethylene terephthalate or copolymerized polyethylene terephthalate containing less than 6 mol % of copolymerization components and a polyester (2) containing a polybutylene terephthalate or copolymerized polybutylene terephthalate containing less than 5 mol % of copolymerization components, and a content of the polyester (1) is 60 mass % or less and a content of the polyester (2) is 40 mass % or more.

[5] The resin-coated metal sheet for containers according to [3] or [4] described above, wherein the resin layer (B) contains 5.0 mass % or less of a wax compound with respect to the resin layer (B).

[6] The resin-coated metal sheet for containers according to [5] described above, wherein an uppermost resin layer (b2) and the resin layer (b1), which is the resin layer (B) excluding the uppermost layer, or the uppermost resin layer (b2) in the resin layer (B) contains a wax compound, and the uppermost resin layer (b2) contains 5.0 mass % or less of the wax compound with respect to the uppermost resin layer (b2).

[7] In the resin-coated metal sheet for containers according to [5] or [6] described above, the wax compound contains carnauba wax.

[8] A method for manufacturing the resin-coated metal sheet for containers according to any of [1] to [7] described above including: determining resin layer forming conditions such that a maximum value of a Raman band intensity ratio ($I_{1720}/I_{1615}$) when measured for a cross section of the uppermost resin layer (a1) by using a laser polarization plane parallel to the surface of the resin layer (a1) is in a range of 0.45 or more and 0.80 or less.

According to the present invention, a resin-coated metal sheet for containers having a good release property for various contents is obtained. The resin-coated metal sheet for containers according to the present invention can stably satisfy many properties required for materials for food cans.

DETAILED DESCRIPTION OF EMBODIMENTS OF THE INVENTION

A resin-coated metal sheet for containers according to embodiments of the present invention will be described below in detail.

First, a metal sheet used in embodiments of the present invention will be described.

Aluminum sheets, mild steel sheets, and the like that are widely used as can materials can be used as the metal sheet of the present invention. In particular, for example, a surface-treated steel sheet (so-called TFS) having a two-layer coating including a lower layer formed of metal chromium and an upper layer formed of chromium hydroxide is most suitable.

Although there is no particular limitation on the coating weights of the metal chromium layer and the chromium hydroxide layer in the TFS, it is preferable that the coating weight of the metal chromium layer is 70 to 200 mg/m² and the coating weight of the chromium hydroxide layer is 10 to 30 mg/m² in terms of chromium from the viewpoints of adhesion after processing and corrosion resistance.

[Composition of Resin Layer (A) to be Located on Container Inner Surface Side]

In an embodiment of the present invention, a resin layer (A) is located on a side of the metal sheet, the side being a side that will serve as a container inner surface when the metal sheet is formed into a container. The resin layer (A) has a multilayer structure containing polyester as a main component. The resin layer (A) is characterized by a polymer including a dicarboxylic acid component and a glycol component and containing 85 mol % or more of terephthalic acid as the dicarboxylic acid component. In the case of less than 85 mol % of terephthalic acid, the resin has a low melting point and thus the frictional heat during forming container makes the resin soft, which may generate defects, such as film shaving, of the film. In a retort sterilization treatment after container formation, water vapor attacks the resin layer, so that the adhesion in a wet environment may deteriorate.

Examples of the dicarboxylic acid component other than terephthalic acid include aromatic dicarboxylic acids, such as isophthalic acid, naphthalenedicarboxylic acid, diphenyl-dicarboxylic acid, sodium 5-sulfoisophthalic acid, phthalic acid; aliphatic dicarboxylic acids, such as oxalic acid, succinic acid, adipic acid, sebacic acid, dimer acid, maleic acid, and fumaric acid; alicyclic dicarboxylic acids, such as cyclohexanedicarboxylic acid; and hydroxy acids, such as p-oxybenzoic acid.

Examples of the glycol component include aliphatic glycols, such as ethylene glycol, propanediol, butanediol, pentanediol, hexanediol, and neopentyl glycol; alicyclic glycols, such as cyclohexanedimethanol; and aromatic glycols, such as bisphenol A and bisphenol S. Of these glycol components, ethylene glycol is preferred. These dicarboxylic acid components may be used in combination of two or more. These glycol components may be used in combination of two or more.

[Wax Compound]

In an embodiment of the present invention, the resin layer (A) includes at least two layers, and an uppermost resin layer (a1), which is to be in contact with contents. The resin layer (A) is characterized by containing 0.10 to 2.0 mass % of a wax compound with respect to the uppermost resin layer (a1). The wax compound is added in order to reduce the surface free energy of the resin layer (A). Adding the wax compound makes it difficult for the contents to adhere to the resin layer (A) and accordingly improves the content release property. The reason for limiting to 0.10 mass % or more is that, in the case of less than 0.10 mass % of the wax compound, the above effect is weak and thus the content release property is poor. The reason for limiting to 2.0 mass % or less is that, in the case of more than 2.0 mass % of the wax compound, the adhesion between the resin layers is likely to deteriorate, and it is thus difficult to form the resin layer (A) itself, resulting in low productivity. The wax compound is not necessarily added to a resin layer other than the uppermost layer. If added, the wax compound is preferably added in an amount of 2.0 mass % or less. It is noted that, even if the wax compound is added to a resin layer other than the uppermost layer, the content release property may not be improved. Therefore, adding the wax compound only to the uppermost layer is effective.

An organic or inorganic lubricant can be used as a component of the wax compound to be added. In particular, carnauba wax, which is a natural vegetable wax, is preferred. A polyester resin containing carnauba wax can be produced by adding a predetermined amount of the wax to polyester, followed by an ordinary production method.

[Crystal Structure of Resin Layer (a1)]

Furthermore, the uppermost resin layer (a1) is characterized in that the maximum value of the Raman band intensity ratio ($I_{1720}/I_{1615}$) when measured for the cross section of the uppermost resin layer (a1) by using a laser polarization plane parallel to the resin layer (a1) is in the range of 0.45 or more and 0.80 or less. Here, $I_{1720}$ is the highest peak height of the Raman band in the range of 1720 cm$^{-1}$±10 cm$^{-1}$ attribute to stretching of the carbonyl group C—O by laser Raman spectroscopy. $I_{1615}$ is the highest peak height of the Raman band in the range of 1615 cm$^{-1}$±10 cm$^{-1}$ attribute to stretching of C=C in the benzene ring of the polyester resin by laser Raman spectroscopy.

For the Raman band in 1720 cm$^{-1}$±10 cm$^{-1}$ attribute to stretching of the carbonyl group C—O, the Raman band intensity ($I_{1720}$) tends to increase with increasing crystallinity of polyester because dicarboxylic acid takes a trans conformation. Therefore, as the Raman band intensity ratio ($I_{1720}/I_{1615}$) increases, more polyester crystals are present parallel to the surface of the resin layer (a1). In contrast, as the Raman band intensity ratio ($I_{1720}/I_{1615}$) decreases, fewer polyester crystals are present parallel to the surface of the resin layer.

As a result of diligent studies by the inventors, it has been found that the content release property can be significantly improved by controlling the crystal structure of the resin layer (a1) such that the maximum value of the Raman band intensity ratio ($I_{1720}/I_{1615}$) is in the range of 0.45 or more and 0.80 or less. The reason for this is as follows.

Since the crystal lattice of a wax compound, such as carnauba wax, contained in the resin layer (a1) is larger than the crystal lattice of polyester, which is a main component of the resin layer (a1), the wax compound cannot be present in the crystalline region of the polyester. Consequently, the wax compound is present only in the amorphous region of the polyester. The polyester resin constituting the resin layer (a1) has a glass transition temperature (Tg) of about 70° C. At this temperature (about 70° C.) or lower, the movement of the molecular chains is frozen and the wax compound is thus fixed in the amorphous region. Therefore, in the process from container formation to content charging and sealing, the resin layer (a1) has a stable structure and the wax compound stays in the amorphous region in the resin layer (a1). However, when the container is heated to about 120° C. to 130° C. in the retort sterilization treatment process, the molecular chains in the amorphous region of the polyester resin start moving in the micro-Brownian motion, and the wax compound accordingly starts moving inside the polyester resin. Since the wax compound has a surface free energy lower than that of the polyester resin, the wax compound is diffused and concentrated on the surface of the resin layer (a1). Consequently, the surface free energy of the resin layer (a1) decreases, and the content release property increases. The content release property is improved by increasing the concentration of the wax compound on the surface of the resin layer (a1).

To increase the concentration of the wax compound on the surface, the crystal structure of the polyester resin constituting the resin layer (a1) needs to be controlled. That is, the polyester resin needs to have a crystal structure in which the wax compound in the resin layer (a1) can be smoothly diffused on the surface.

As a result of studies by the inventors, it has been found that the concentration of the wax compound on the surface is significantly reduced by increasing the amount of the crystal aligned in a direction parallel to the surface of the resin layer (a1). The reason for this is that the crystal is aligned in a direction perpendicular to the wax diffusion direction and thus the crystal functions like a diffusion barrier. The crystal aligned in this manner also functions as a barrier layer against water vapor, which leads to retort-blushing, and chlorine ions, water, and oxygen, which lead to corrosion. Consequently, the amount of the crystal needs to be controlled in the range in which required properties are well balanced.

In an embodiment of the present invention, the maximum value of the Raman band intensity ratio ($I_{1720}/I_{1615}$) when measured for the cross section of the resin layer (a1) by using a laser polarization plane parallel to the surface of the resin layer (a1) is defined in the range of 0.45 or more and 0.80 or less. When the maximum value is in this range, the concentration of the wax compound on the surface is smoothly increased, a good content release property is obtained, and a good barrier property against water vapor and corrosion factors can be ensured. However, when the Raman band intensity ratio ($I_{1720}/I_{1615}$) is less than 0.45, a shortage of the crystal results in a poor barrier property, which may cause retort-blushing and deterioration in corrosion resistance. When the Raman band intensity ratio ($I_{1720}/I_{1615}$) is more than 0.80, an excess of the crystal inhibits an increase in the concentration of the wax compound on the surface, so that a good content release property cannot be obtained. In addition, the resin layer loses its flexibility, and thus formability and the like deteriorate.

[Thickness of Resin Layer (a1)]

The thickness of the resin layer (a1) is in the range of 0.5 µm or more and 10 µm or less. The amount of the wax compound added is limited to 2.0 mass % or less with respect to the resin layer (a1). Thus, when the thickness of the resin layer (a1) is less than 0.5 µm, the amount of the wax itself is insufficient and a good content release property is not obtained. In contrast, when the thickness of the resin layer (a1) is more than 10 µm, the ratio of the resin layer (a1) to the resin layer (A) is too large, which may degrade the adhesion between the resin layer (A) and the metal sheet as well as the functions, such as formability and corrosion resistance, of the resin layer (A). Therefore, the thickness of the resin layer (a1) is set to 0.5 µm or more and 10 µm or less.

[Thickness of Resin Layer (A) Excluding Thickness of Uppermost Resin Layer (a1)]

The thickness of the resin layer (A) excluding the thickness of the uppermost resin layer (a1) is set to 5 μm or more and 20 μm or less. A lower resin layer that is the resin layer (A) excluding the uppermost resin layer (a1) is defined as a resin layer (a2). When the resin layer (a2) has a thickness of less than 5 μm, the resin layer (a2) fails to keep its resin strength sufficient to ensure the adhesion with the metal sheet and maintain the adhesion at the interface with the resin layer (a1). In contrast, when the resin layer (a2) has a thickness of more than 20 μm, the resin layer (a2) fails to have improved functions expected for materials for beverage cans and materials for food cans and also the cost of resin increases. Therefore, the thickness of the resin layer (A) excluding the thickness of the uppermost resin layer (a1), namely, the thickness of the resin layer (a2), is set to 5 μm or more and 20 μm or less.

[Composition of Resin Layer (B) to be Located on Container Outer Surface Side]

A resin layer (B) having a polyester-based multilayer structure is preferably located on a side of the metal sheet, the side being a side that will serve as a container outer surface when the metal sheet is formed into a container. A resin layer (b1), which is the resin layer (B) excluding an uppermost layer, preferably contains titanium dioxide or a disazo organic pigment as a color pigment. The resin layer to be located on the container outer surface side needs to maintain its good appearance even after container formation and after a retort sterilization treatment. Therefore, the resin layer (b1) preferably contains titanium dioxide or a disazo organic pigment as a color pigment in order to impart design properties.

The polyester-based resin layer (B) is formed of a polymer including a dicarboxylic acid component and a glycol component. The resin layer (B) preferably contains 85 mol % or more of terephthalic acid as the dicarboxylic acid component. In the case of less than 85 mol % of terephthalic acid, the resin has a low melting point and thus the frictional heat during container formation makes the resin soft, which may generate defects, such as film shavings, of the film. In the retort sterilization treatment after container formation, water vapor attacks the resin layer, so that the adhesion in a wet environment may deteriorate.

Examples of the dicarboxylic acid component other than terephthalic acid include aromatic dicarboxylic acids, such as isophthalic acid, naphthalenedicarboxylic acid, diphenyldicarboxylic acid, sodium 5-sulfoisophthalic acid, phthalic acid; aliphatic dicarboxylic acids, such as oxalic acid, succinic acid, adipic acid, sebacic acid, dimer acid, maleic acid, and fumaric acid; alicyclic dicarboxylic acids, such as cyclohexanedicarboxylic acid; and hydroxy acids, such as p-oxybenzoic acid.

Examples of the glycol component include aliphatic glycols, such as ethylene glycol, propanediol, butanediol, pentanediol, hexanediol, and neopentyl glycol; alicyclic glycols, such as cyclohexanedimethanol; and aromatic glycols, such as bisphenol A and bisphenol S. Of these glycol components, ethylene glycol and butylene glycol are preferred. These dicarboxylic acid components may be used in combination of two or more. These glycol components may be used in combination of two or more.

To impart color development of bright gold to the resin layer (B) that has a multilayer structure and will be located on the container outer surface side, a disazo organic pigment is preferably added as a color pigment to the resin layer (b1), which is the resin layer (B) excluding the uppermost layer. Since such a pigment exhibits yellow color but has transparency, the pigment can efficiently provide bright gold color by using the luster of the metal sheet.

In general, the use of an oil color is known as a method for providing highly transparent color. Unfortunately, one of disadvantages of this method is transferability (elution of a color material from a colored resin).

This is a phenomenon (bleeding) in which an oil color dissolved in a colored resin comes up to the resin surface when the resin undergoes a heat history such as a retort sterilization treatment. However, since a disazo organic pigment is generally present as particles in a resin, the transferability can be significantly reduced.

A disazo organic pigment is preferably applied as a yellow pigment. In particular, C.I. Pigment Yellow 180 is preferably used because the C.I. Pigment Yellow 180, a pigment registered in FDA (U.S. Food and Drug Administration), has a high degree of safety and can provide good color tone. The amount of the disazo organic pigment added is preferably 0.1 mass % or more and 20.0 mass % or less with respect to the total amount of the resin layer (B). The addition of less than 0.1 mass % of the disazo organic pigment results in poor color development and unfavorable color tone. The addition of more than 20.0 mass % of the disazo organic pigment may cause the resin to have poor transparency and have color tone with low brightness. The pigment preferably has a particle size of less than 1 μm. A particle size of 1 μm or more is not preferred because the polyester resin may lose its transparency. Furthermore, metal salts of higher fatty acids, such as magnesium stearate, can be used as a dispersant. The use of a dispersant provides more uniform color tone with high transparency.

Other than the yellow pigment, the addition of a white pigment hides underlying metallic luster and improves the distinctness of images on a printing surface, providing favorable appearance. The pigment to be added needs to exhibit good design properties after container formation. From such a viewpoint, titanium dioxide is preferably used. This is because titanium dioxide has high tinting strength and high ductility, and thus can ensure good design properties even after container formation. The amount of the white pigment added is preferably 10.0 mass % or more and 30.0 mass % or less with respect to the total amount of the resin layer (B). The addition of less than 10.0 mass % of the white pigment results in poor color development and unfavorable color tone. In contrast, the addition of more than 30.0 mass % of the white pigment may cause the resin layer (B) to lose its flexibility, so that the resin layer (B) may not be adapted to container formation.

[Wax Compound]

Moreover, in the present invention, the resin layer (B) preferably contains 5.0 mass % or less of a wax compound with respect to the resin layer (B) in order to prevent flaws or shavings on the resin layer (B) during high processing. The presence of more than 5.0 mass % of the wax compound is not suitable for print applications because the adhesion between the resin layer (B) and an ink deteriorates during printing of images and characters on the container outer surface. In addition, such an amount of the wax compound is not preferred because it is difficult to form the resin layer (B). When the amount of the wax compound is less than 0.02 mass %, the addition of the wax compound may not provide an effect of preventing flaws or shavings of the resin layer (B). If the wax compound is added, the amount of the wax compound is preferably 0.02 mass % or more.

The wax compound can be added to the uppermost resin layer (b2) and/or the resin layer (b1), which is the resin layer (B) excluding the uppermost layer. In particular, the wax compound is preferably added to the uppermost resin layer (b2) in order to prevent flaws or scratches of the resin layer (B) during high processing as well as to ensure the formability of the resin layer (B) during high processing. When the wax compound is added only to the uppermost resin layer (b2), the amount of the wax compound sufficient to obtain such effects is smaller than that required when the wax compound is added to the entire resin layer (B).

When the wax compound is added to the uppermost resin layer (b2), the amount of the wax compound contained in the uppermost resin layer (b2) is preferably 5.0 mass % or less with respect to the resin layer (B). (based on the entire layer), and preferably 5.0 mass % or less with respect to the uppermost resin layer (b2). The presence of more than 5.0 mass % of the wax compound is not suitable for print applications because the adhesion between the resin layer (B) and an ink deteriorates during printing of images and characters on the container outer surface. In addition, such an amount of the wax compound is not preferred because it is difficult to form the resin layer (B). The lower limit of the amount of the wax compound contained in the uppermost resin layer (b2) is preferably 0.02 mass % with respect to the resin layer (B) (based on the entire layer) in order to obtain the effects of the wax compound contained.

That is, the upper limit of the amount of the wax compound contained in each of the entire resin layer (B), the uppermost resin layer (b2), and the resin layer (b1), which is the resin layer (B) excluding the uppermost layer, is preferably 5.0 mass %.

When the uppermost resin layer (b2) and the resin layer (b1), which is the resin layer (B) excluding the uppermost layer, contain the wax, the amount of the wax compound based on the entire resin layer (B) can be calculated by dividing the mass of the wax compound contained in the uppermost resin layer (b2) and the resin layer (b1), which is the resin layer (B) excluding the uppermost layer, by the mass of the entire resin layer (B).

The wax compound is not limited. Both an organic lubricant and an inorganic lubricant can be used. The same wax component as that in the resin layer (A) can be used. Since the temperature of the resin surface on the container outer surface side tends to be higher than that on the inner surface side because of the friction against a mold during can making, a wax compound having a high melting point is preferred. The melting point of the wax compound is preferably 50° C. or more, and more preferably 70° C. or more. Examples of suitable wax compounds include natural waxes, such as carnauba wax and candelilla wax; fatty acid esters, such as stearate; and polyolefin waxes, such as polyethylene wax. These wax compounds can be used alone or in a mixture of two or more.

[Thickness of Resin Layer (b1)]

The resin layer (b1) preferably has a thickness of 5 μm or more from the viewpoint of design properties. When the resin layer (b1) has a thickness of less than 5 μm, an excess amount of the pigment is present with respect to the thickness and the pigment is poorly dispersed, which may result in the resin layer with low transparency. The mechanical properties of the resin layer (b1) may also deteriorate.

[Structure of Resin Layer (B)]

As described above, the resin layer (B) used in the present invention preferably has a multilayer structure including two or more resin layers. The resin layer (b2) with no pigment is formed as an uppermost layer (for two layers, a layer on the resin layer (b1) containing the pigment). When the resin layer (b2) is formed as an uppermost layer (for two layers, a layer on the resin layer (b1) containing a large amount of the pigment), the bleeding of the pigment during the retort treatment can be assuredly suppressed. The bleeding is a phenomenon in which a pigment is diffused in a polyester resin. The resin layer (b2) with no pigment, namely, a clear layer, functions as a diffusion barrier and hinders the pigment from moving to the surface of the resin layer. The resin layer (b2) preferably has a thickness of 1.5 μm or more. When the heat history of the retort treatment, namely, 120° C. or more for 1 hour or longer, to be applied to food cans is taken into consideration, the pigment may be eluted in the case of the resin layer (b2) having a thickness of less than 1.5 μm.

The multilayer structure of the resin layer (B) used in the present invention is not limited to a two-layer structure. For example, the resin layer (B) more preferably has a three-layer structure (adhesion layer, resin layer (b1), and resin layer (b2)) in which an adhesion layer having good adhesion with the metal sheet is disposed on the side of the resin layer (B) to adhere to the metal sheet and interposed between the resin layer (b1) and the metal sheet. The adhesion layer preferably has good adhesion with the metal sheet and preferably has compatibility with polyethylene terephthalate contained in the layer on the adhesion layer. From the viewpoints of costs and ease of color incorporation (described below), an adhesive, such as epoxy phenol, can also be used for the adhesion layer on the container outer surface side. For example, when the layer containing the pigment directly contacts the metal sheet and the adhesion therebetween deteriorates, a three-layer structure that has a clear layer containing no pigment and located on the side to be in contact with the metal sheet can be used.

[Composition of Resin Layer (b1)]

The composition of the resin layer (b1) is a polyester composition in which a polyethylene terephthalate copolymer (hereinafter may also be referred to as a polyester (1)) containing less than 6 mol % of polyethylene terephthalate or a copolymer component is mixed with a polybutylene terephthalate copolymer (hereinafter may also be referred to as a polyester (2)) containing less than 5 mol % of polybutylene terephthalate or a copolymer component. The resin layer (b1) preferably contains 60 mass % or less of the polyester (1) and 40 mass % or more of the polyester (2). In a retort sterilization treatment, which is essential to food can applications, such a resin composition allows the resin layer to maintain its adhesion with the metal sheet and also leads to a reduction in resin discoloration caused as a result of condensation of water vapor in the resin layer. When the percentage of the polyester (2) is less than 40 mass %, condensation of water vapor cannot be reduced during a retort sterilization treatment at a high temperature of 120° C. or more for a long time (1 hour or longer), resulting in formation of liquid bubbles in the resin layer. The liquid bubbles remaining in the resin layer after the retort sterilization treatment leads to scattering of visible light, which may change the appearance of the resin and may degrade design properties. When the percentage of the polyester (2) is more than 70 mass %, resin discoloration during the retort sterilization treatment can be reduced but the thermal resistance and the mechanical properties of the resin tends to deteriorate. Consequently, the resin may be damaged by the influence of, for example, the stress and the frictional heat during can making. Since the Tg of the polyester (2) is about 40° C., which is lower than that of the polyester (1), exposure of the resin to a temperature beyond room temperature may cause a significant reduction in the barrier properties of the resin, which may lead to a notable deterioration in corrosion resistance. Therefore, the percentage of the polyester (2) is preferably 40 mass % or more, more preferably 40 to 70 mass %, still more preferably 45 to 65 mass %, yet still more preferably 50 to 60 mass %.

The polyester (1) may include a copolymer component in the range of less than 6 mol %, in which advantages of the present invention are not impaired. The copolymer component may be an acid component or an alcohol component. Examples of the acid component include aromatic dicarboxylic acids, such as isophthalic acid, phthalic acid, and naphthalenedicarboxylic acid; aliphatic dicarboxylic acids, such as adipic acid, azelaic acid, sebacic acid, and decanedicarboxylic acid; and alicyclic dicarboxylic acids, such as cyclohexanedicarboxylic acid. Of these, isophthalic acid is most preferred from the viewpoint of formability. Examples of the alcohol component include aliphatic diols, such as diethylene glycol, propanediol, butanediol, and hexanediol; and alicyclic diols, such as cyclohexanedimethanol.

The polyester (2) is obtained by polycondensation of a terephthalic acid component and a 1,4-butanediol component, which are main components. These components may be copolymerized with another component in the range of less than 5 mol %, in which advantages of the present invention are not impaired. The copolymer component may be an acid component or an alcohol component. Examples of the acid copolymer component include aromatic dicarboxylic acids, such as isophthalic acid, phthalic acid, and naphthalenedicarboxylic acid; aliphatic dicarboxylic acids, such as adipic acid, azelaic acid, sebacic acid, and decanedicarboxylic acid; and alicyclic dicarboxylic acids, such as cyclohexanedicarboxylic acid. Of these, isophthalic acid, 2,6-naphthalenedicarboxylic acid, or adipic acid is preferred. Examples of the copolymer alcohol component include aliphatic diols, such as ethylene glycol, propanediol, and hexanediol; and alicyclic diols, such as cyclohexanedimethanol. These may be used alone or in combination of two or more.

[Composition of Resin Layer (b2)]

The resin layer (b2) is formed of a polymer including a dicarboxylic acid component and a glycol component. The resin layer (b2) preferably contains 85 mol % or more of terephthalic acid as the dicarboxylic acid component. In the case of less than 85 mol % of terephthalic acid, the resin has a low melting point and thus the frictional heat during container formation makes the resin soft, which may generate defects, such as shaving, of the film. In a retort sterilization treatment after container formation, water vapor attacks the resin layer, so that the adhesion in a wet environment may deteriorate.

Examples of the dicarboxylic acid component other than terephthalic acid include aromatic dicarboxylic acids, such as isophthalic acid, naphthalenedicarboxylic acid, diphenyldicarboxylic acid, sodium 5-sulfoisophthalic acid, phthalic acid; aliphatic dicarboxylic acids, such as oxalic acid, succinic acid, adipic acid, sebacic acid, dimer acid, maleic acid, and fumaric acid; alicyclic dicarboxylic acids, such as cyclohexanedicarboxylic acid; and hydroxy acids, such as p-oxybenzoic acid.

Examples of the glycol component include aliphatic glycols, such as ethylene glycol, propanediol, butanediol, pentanediol, hexanediol, and neopentyl glycol; alicyclic glycols, such as cyclohexanedimethanol; and aromatic glycols, such as bisphenol A and bisphenol S. Of these glycol components, ethylene glycol and butylene glycol are preferred. These dicarboxylic acid components may be used in combination of two or more. These glycol components may be used in combination of two or more.

[Production Method]

Next, embodiments of a method for manufacturing a resin-coated metal sheet for containers in the present invention will be described.

First, a method for manufacturing resin layers (A) and (B) (which may be films), which have a multilayer structure and cover a metal sheet, will be described.

The method for manufacturing the resin layers (films) is not limited. For example, each polyester resin is dried as desired and then introduced into a known melt lamination extruder and extruded from a slit-like die to form a sheet-like polyester resin. The sheet-like polyester resin is brought into close contact with a casting drum by a technique, such as application of static electricity, and solidified by cooling to provide an unstretched film (sheet). To obtain a multilayer film, an intended resin is added to the lamination extruder to provide an unstretched film having a multilayer structure. This unstretched film is stretched in the longitudinal direction and the transverse direction to provide a biaxially stretched film. The stretching ratio can be freely set in accordance with the degree of orientation, the strength, and the modulus of elasticity of a desired film. The film is preferably stretched by a tenter method from the viewpoint of the quality of the film. Preferred is a sequential biaxial stretching technique in which the film is stretched in the longitudinal direction and then stretched in the transverse direction, or a simultaneous biaxial stretching technique in which the film is stretched in the longitudinal direction and the transverse direction substantially simultaneously.

Next, an example method for manufacturing a resin-coated metal sheet by laminating resin layers (films) on a metal sheet will be described.

In the present invention, for example, the following method (hereinafter referred to as a lamination method) can be used: the metal sheet is heated to a temperature beyond the melting points of the films, and the resin films are brought into contact with and thermally fusion-bonded to both sides of the metal sheet by using pressure rollers (hereinafter referred to as lamination rollers). At this time, the resin layer (a2) with no wax compound in a film to be located on the container inner surface side after container formation is brought into contact with and thermally fusion-bonded to the metal sheet.

The lamination conditions are appropriately set so as to obtain the resin layers defined in the present invention. For example, first, the surface temperature of the metal sheet at the start of lamination is equal to or higher than the Tm (melting point) (° C.) of the resin layers to be in contact with the metal sheet. Specifically, the surface temperature of the metal sheet is controlled in the range from Tm to Tm+40° C. of the resin layers. When the surface temperature of the metal sheet is equal to or higher than the Tm of the resin layers, the resin layers are melted and wet the surface of the metal sheet, which ensures good adhesion with the metal sheet. In contrast, when the surface temperature of the metal sheet is higher than Tm+40° C., the resin layers are excessively melted and may be attached to the lamination rollers, and it is also difficult to control the crystal structure of the resin layer (a1), which is a surface layer, within the scope of the present invention. The surface temperature of the metal sheet is preferably Tm to Tm+25° C., and more preferably Tm to Tm+15° C.

To control the crystal structure of the resin layer (a1), which is the uppermost layer of the resin layer (A), in an appropriate state, the surface temperature of the lamination rollers is adjusted. Specifically, the surface temperature of the lamination rollers is controlled in the range from Tg to Tg+60° C. of the resin layer (a1). Naturally, adjusting the time of contact with the lamination rollers is also an important factor. The contact time is controlled in the range from 10 to 25 msec. The crystal structure of the resin layer (a1) defined in the present invention can be obtained by controlling the surface temperature of the lamination rollers and the contact time in the above ranges.

The resin layers (A) and (B) are preferably heated before lamination. When the resin layers are soften in advance, the temperature distribution in the cross section of the resin layers can be made uniform at the time of lamination. It has been found that this process reduces a change in crystal structure in the cross section of the resin layers from the interface with the metal sheet to the surface layer and allows the resin layers to exert more uniform performance. Specifically, the temperatures of the resin layers (A) and (B) before lamination are preferably controlled in the range from Tg+30° C. to Tg+100° C.

After lamination, quenching is performed immediately to set the crystal structure of the resin layers. The time until quenching is preferably 5 seconds or less, and the temperature of water in quenching is Tg or lower.

In the present invention, it is preferred that each resin layer be formed into a film and applied to the metal sheet. The crystal structure defined in the present invention may not be obtained by melt extrusion lamination in which the resin layers are melted and applied to the surface of the metal sheet without forming the resin layers into films.

Example 1

Examples of the present invention will be described below.
(Method for Manufacturing Metal sheet)
A steel plate with a thickness of 0.18 mm and a width of 977 mm obtained after cold rolling, annealing, and temper rolling was subjected to degreasing, acid pickling, and subsequent chromium coating, and a chromium-coated steel sheet (TFS) was produced accordingly. Chromium coating involved chromium coating in a chromium-coating bath containing $CrO_3$, $F^-$, and $SO_4^{2-}$, intermediate rinsing, and subsequent electrolysis in a passivation solution containing $CrO_3$ and $F^-$. In this case, electrolysis conditions (e.g., current density, quantity of electricity) were controlled such that the coating weight of metal chromium and the coating weight of chromium hydroxide were respectively 120 mg/m$^2$ and 15 mg/m$^2$ based on the amount of chromium.

(Method for Manufacturing Resin Coating Film to be Located on Container Inner Surface Side)
A polyester resin obtained by polymerization of the acid component(s) and the glycol component shown in Table 1 was mixed with a wax compound in the ratio shown in Table 1 to provide a resin composition. The resin composition was dried and melted in accordance with an ordinary method and coextruded from a T-die. The obtained product was then solidified by cooling on a cooling drum to provide an unstretched film. The unstretched film was biaxially stretched and thermally set to provide a biaxially stretched polyester film (A).

(Method for Manufacturing Resin Coating Film to be Located on Container Outer Surface Side)
The acid component(s) and the glycol component(s) shown in Table 2 were copolymerized such that all acid copolymer components other than terephthalic acid were polymerized with ethylene glycol to provide polyethylene terephthalate or a polyethylene terephthalate copolymer, which was further mixed with polybutylene terephthalate obtained by polymerization of terephthalic acid and butylene glycol, providing a polyester resin. This polyester resin was mixed with a color pigment to provide a resin composition. The resin composition was dried and melted in accordance with an ordinary method and coextruded from a T-die. The obtained product was then solidified by cooling on a cooling drum to provide an unstretched film. The unstretched film was biaxially stretched and thermally set to provide a biaxially stretched polyester film (B).

Figure 1:
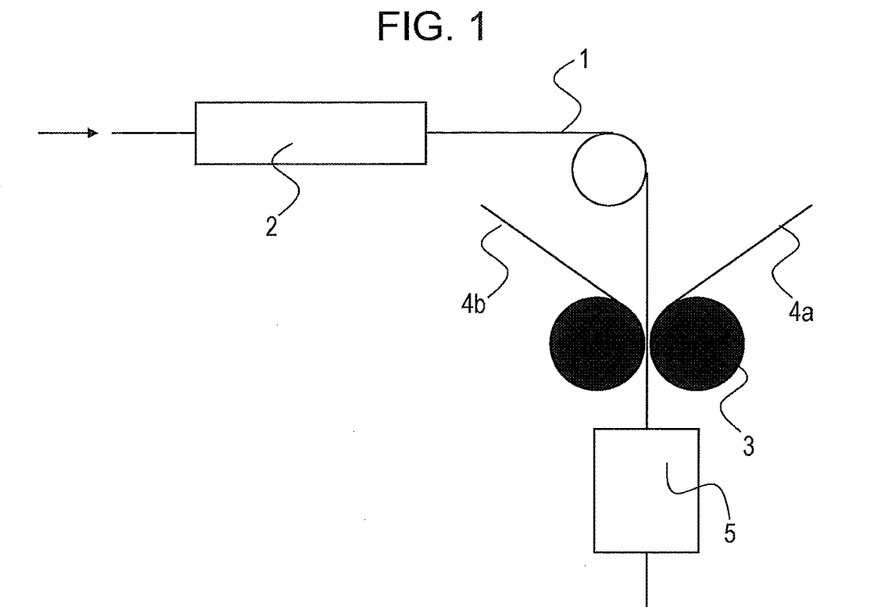
FIG. 1 illustrates the main part of a lamination device for a metal sheet (Example 1).

(Method for Manufacturing Resin-Coated Metal Sheet for Containers)
A chromium-coated steel sheet 1 obtained above was heated with a metal-belt heating device 2 in a metal-belt lamination apparatus shown in FIG. 1. A polyester film (A), which was to be located on the container inner surface side after container formation, was laminated on (thermally fused to) one surface of the chromium-coated steel sheet 1 by using a lamination roller 3, while a polyester film (B), which was to be located on the container outer surface side, was laminated on (thermally fusion-bonded to) the other surface of the chromium-coated steel sheet 1.

When the polyester film (A) was laminated on the metal sheet, the surface temperature of the metal sheet was controlled in the range from Tm to Tm+40° C. of the polyester resin layer (a1) contained in the polyester film (A) in Examples except for some Comparative Examples. The surface temperature of lamination rollers 3 was controlled in the range from Tg to Tg+60° C. of the polyester film (A). The time of contact with the metal sheet was controlled in the range from 10 to 15 msec. The resins described in Table 1 have substantially the same Tg, which was about 75° C. The lamination rollers 3 used an internal water cooling system. Temperature control was performed during the bonding of the films by circulating cooling water in the rollers. The temperature of the resin layer before lamination was controlled in the range from Tg+30° C. to Tg+100° C. of the polyester film (A), which made uniform the temperature distribution in the cross section of the resin layer. Subsequently, cooling with water was performed in a metal-belt cooling device 5, and a resin-coated metal sheet for containers was produced accordingly. The production conditions are shown in Table 3.

Figure 2:
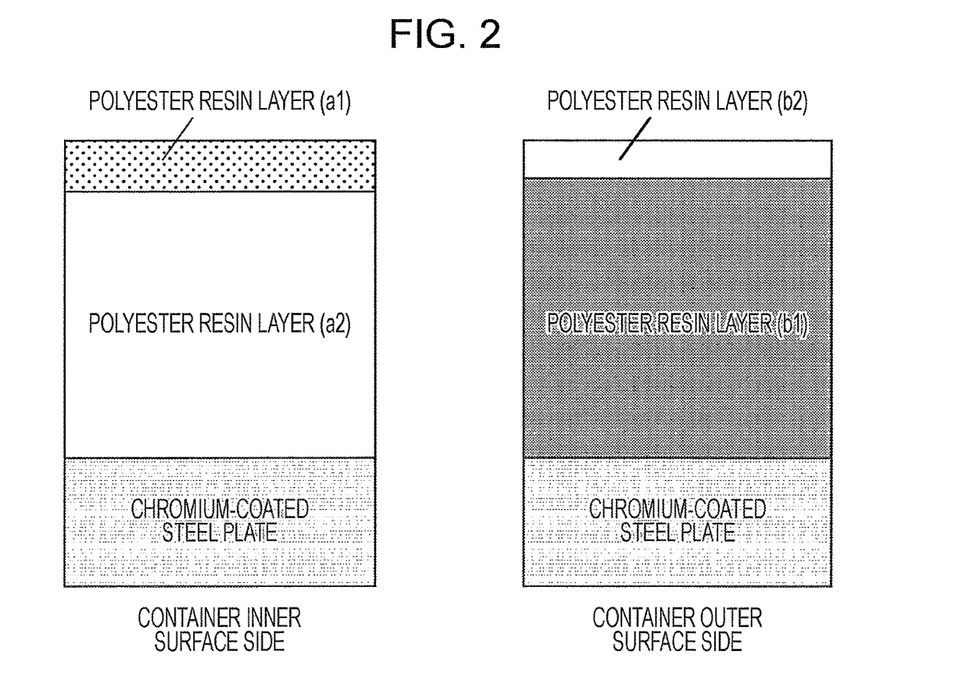
FIG. 2 illustrates the cross-sectional structure of a resin-coated metal sheet for containers (Example 1).

The cross-sectional structure of the resin-coated metal sheet for containers produced as described above is shown in FIG. 2.

TABLE 1

| | Can inner surface side: polyester film (a1) (upper layer) | | | | | |
|---|---|---|---|---|---|---|
| | Resin type | | Wax compound | | Raman band intensity ratio ($I_{1720}/I_{1615}$) | |
| No. | Acid component | Glycol component | Type | Content (mass %) | Maximum value | Mean value |
| 1 | Terephthalic acid (100) | Ethylene glycol (100) | Carnauba wax | 0.8 | 0.62 | 0.58 |
| 2 | Terephthalic acid (100) | Ethylene glycol (100) | Carnauba wax | 0.7 | 0.56 | 0.52 |
| 3 | Terephthalic acid (100) | Ethylene glycol (100) | Carnauba wax | 0.9 | 0.63 | 0.62 |
| 4 | Terephthalic acid (100) | Ethylene glycol (100) | Carnauba wax | 0.8 | 0.64 | 0.60 |

TABLE 1-continued

| No. | Acid component | Glycol component | Wax type | (col 1) | (col 2) | (col 3) |
|---|---|---|---|---|---|---|
| 5 | Terephthalic acid (100) | Ethylene glycol (100) | Carnauba wax | 0.8 | 0.65 | 0.62 |
| 6 | Terephthalic acid (100) | Ethylene glycol (100) | Carnauba wax | 0.7 | 0.72 | 0.68 |
| 7 | Terephthalic acid (100) | Ethylene glycol (100) | Carnauba wax | 0.8 | 0.78 | 0.72 |
| 8 | Terephthalic acid (100) | Ethylene glycol (100) | Carnauba wax | 0.8 | 0.48 | 0.44 |
| 9 | Terephthalic acid (100) | Ethylene glycol (100) | Carnauba wax | 0.8 | 0.45 | 0.41 |
| 10 | Terephthalic acid (100) | Ethylene glycol (100) | Carnauba wax | 0.2 | 0.62 | 0.58 |
| 11 | Terephthalic acid (100) | Ethylene glycol (100) | Carnauba wax | 1.8 | 0.62 | 0.58 |
| 12 | Terephthalic acid (100) | Ethylene glycol (100) | Carnauba wax | 1.2 | 0.56 | 0.56 |
| 13 | Terephthalic acid (100) | Ethylene glycol (100) | Carnauba wax | 0.7 | 0.62 | 0.58 |
| 14 | Terephthalic acid (100) | Ethylene glycol (100) | Polyethylene wax | 1.0 | 0.62 | 0.58 |
| 15 | Terephthalic acid (100) | Ethylene glycol (100) | Polyethylene wax | 1.5 | 0.56 | 0.52 |
| 16 | Terephthalic acid (90) Isophthalic acid (10) | Ethylene glycol (100) | Carnauba wax | 0.9 | 0.65 | 0.62 |
| 17 | Terephthalic acid (87) Isophthalic acid (13) | Ethylene glycol (100) | Carnauba wax | 0.8 | 0.63 | 0.60 |
| 18 | Terephthalic acid (100) | Ethylene glycol (100) | Carnauba wax | 0.8 | 0.58 | 0.52 |
| 19 | Terephthalic acid (100) | Ethylene glycol (100) | Carnauba wax | 0.7 | 0.64 | 0.60 |
| 20 | Terephthalic acid (100) | Ethylene glycol (100) | Carnauba wax | 0.9 | 0.48 | 0.45 |
| 21 | Terephthalic acid (100) | Ethylene glycol (100) | Carnauba wax | 0.05 | 0.62 | 0.58 |
| 22 | Terephthalic acid (100) | Ethylene glycol (100) | Carnauba wax | 1.2 | 0.42 | 0.40 |
| 23 | Terephthalic acid (100) | Ethylene glycol (100) | Carnauba wax | 1.2 | 0.83 | 0.81 |
| 24 | Terephthalic acid (88) Isophthalic acid (12) | Ethylene glycol (100) | Carnauba wax | 1.2 | 0.56 | 0.52 |
| 25 | Terephthalic acid (100) | Ethylene glycol (100) | Carnauba wax | 1.2 | 0.64 | 0.60 |
| 26 | Terephthalic acid (80) Isophthalic acid (20) | Ethylene glycol (100) | Carnauba wax | 0.8 | 0.48 | 0.44 |

| | Can inner surface side: polyester film (a1) (upper layer) | | Can inner surface side: polyester film (a2) (lower layer) | | | |
|---|---|---|---|---|---|---|
| No. | Thickness (μm) | Melting point (° C.) | Acid component | Glycol component | Thickness (μm) | Melting point (° C.) |
| 1 | 3.0 | 255 | Terephthalic acid (100) | Ethylene glycol (100) | 12.0 | 255 |
| 2 | 3.0 | 255 | Terephthalic acid (100) | Ethylene glycol (100) | 12.0 | 255 |
| 3 | 3.0 | 255 | Terephthalic acid (100) | Ethylene glycol (100) | 12.0 | 255 |
| 4 | 3.0 | 255 | Terephthalic acid (100) | Ethylene glycol (100) | 12.0 | 255 |
| 5 | 3.0 | 255 | Terephthalic acid (100) | Ethylene glycol (100) | 12.0 | 255 |
| 6 | 3.0 | 255 | Terephthalic acid (100) | Ethylene glycol (100) | 12.0 | 255 |
| 7 | 3.0 | 255 | Terephthalic acid (100) | Ethylene glycol (100) | 12.0 | 255 |
| 8 | 3.0 | 255 | Terephthalic acid (100) | Ethylene glycol (100) | 12.0 | 255 |
| 9 | 3.0 | 255 | Terephthalic acid (100) | Ethylene glycol (100) | 12.0 | 255 |
| 10 | 3.0 | 255 | Terephthalic acid (100) | Ethylene glycol (100) | 12.0 | 255 |
| 11 | 3.0 | 255 | Terephthalic acid (100) | Ethylene glycol (100) | 12.0 | 255 |
| 12 | 0.7 | 255 | Terephthalic acid (100) | Ethylene glycol (100) | 14.3 | 255 |
| 13 | 8.0 | 255 | Terephthalic acid (100) | Ethylene glycol (100) | 7.0 | 255 |
| 14 | 3.0 | 255 | Terephthalic acid (100) | Ethylene glycol (100) | 12.0 | 255 |
| 15 | 3.0 | 255 | Terephthalic acid (100) | Ethylene glycol (100) | 12.0 | 255 |
| 16 | 3.0 | 230 | Terephthalic acid (90) Isophthalic acid (10) | Ethylene glycol (100) | 12.0 | 230 |
| 17 | 3.0 | 224 | Terephthalic acid (87) Isophthalic acid (13) | Ethylene glycol (100) | 12.0 | 224 |
| 18 | 3.0 | 255 | Terephthalic acid (87) Isophthalic acid (13) | Ethylene glycol (100) | 12.0 | 224 |
| 19 | 3.0 | 255 | Terephthalic acid (100) | Ethylene glycol (100) | 12.0 | 255 |
| 20 | 3.0 | 255 | Terephthalic acid (100) | Ethylene glycol (100) | 12.0 | 255 |
| 21 | 3.0 | 255 | Terephthalic acid (100) | Ethylene glycol (100) | 12.0 | 255 |
| 22 | 3.0 | 255 | Terephthalic acid (100) | Ethylene glycol (100) | 12.0 | 255 |
| 23 | 3.0 | 255 | Terephthalic acid (100) | Ethylene glycol (100) | 12.0 | 255 |
| 24 | 0.1 | 226 | Terephthalic acid (88) Isophthalic acid (12) | Ethylene glycol (100) | 14.9 | 226 |
| 25 | 12.0 | 255 | Terephthalic acid (100) | Ethylene glycol (100) | 3.0 | 255 |
| 26 | 3.0 | —*) | Terephthalic acid (100) | Ethylene glycol (100) | 12.0 | 255 |

*)Specific melting point is not detected.

TABLE 2

| | Can outer surface side: polyester film (b1) (lower layer) | | | |
|---|---|---|---|---|
| | Resin type | | Color pigment | |
| No. | Acid component | Glycol component | Type | Content (mass %)* |
| 1 | Terephthalic acid (100) | Ethylene glycol (50) Butylene glycol (50) | Pigment Yellow 180 | 5 |
| 2 | Terephthalic acid (100) | Ethylene glycol (40) Butylene glycol (60) | Pigment Yellow 180 | 2 |
| 3 | Terephthalic acid (100) | Ethylene glycol (30) Butylene glycol (70) | Pigment Yellow 180 | 3 |
| 4 | Terephthalic acid (100) | Ethylene glycol (50) Butylene glycol (50) | Pigment Yellow 180 | 1 |
| 5 | Terephthalic acid (100) | Ethylene glycol (50) Butylene glycol (50) | Pigment Yellow 180 | 10 |
| 6 | Terephthalic acid (100) | Ethylene glycol (50) Butylene glycol (50) | Pigment Yellow 180 | 15 |
| 7 | Terephthalic acid (100) | Ethylene glycol (50) Butylene glycol (50) | Pigment Yellow 180 | 10 |
| 8 | Terephthalic acid (100) | Ethylene glycol (40) Butylene glycol (60) | Pigment Yellow 180 | 5 |
| 9 | Terephthalic acid (100) | Ethylene glycol (30) Butylene glycol (70) | Pigment Yellow 180 | 10 |
| 10 | Terephthalic acid (97) Isophthalic acid (3) | Ethylene glycol (40) Butylene glycol (60) | Pigment Yellow 180 | 5 |
| 11 | Terephthalic acid (100) | Ethylene glycol (50) Butylene glycol (50) | Titanium dioxide | 15 |
| 12 | Terephthalic acid (100) | Ethylene glycol (50) Butylene glycol (50) | Titanium dioxide | 20 |
| 13 | Terephthalic acid (100) | Ethylene glycol (50) Butylene glycol (50) | Titanium dioxide | 15 |
| 14 | Terephthalic acid (99) Isophthalic acid (1) | Ethylene glycol (50) Butylene glycol (50) | Titanium dioxide | 10 |
| 15 | Terephthalic acid (100) | Ethylene glycol (50) Butylene glycol (50) | Titanium dioxide | 8 |
| 16 | Terephthalic acid (90) Isophthalic acid (10) | Ethylene glycol (50) Butylene glycol (50) | Titanium dioxide | 15 |
| 17 | Terephthalic acid (87) Isophthalic acid (13) | Ethylene glycol (40) Butylene glycol (60) | Pigment Yellow 180 | 10 |
| 18 | Terephthalic acid (100) | Ethylene glycol (40) Butylene glycol (60) | Pigment Yellow 180 | 12 |
| 19 | Terephthalic acid (100) | Ethylene glycol (50) Butylene glycol (50) | Pigment Yellow 214 | 10 |
| 20 | Terephthalic acid (100) | Ethylene glycol (50) Butylene glycol (50) | Pigment Yellow 214 | 15 |
| 21 | Terephthalic acid (100) | Ethylene glycol (100) | Pigment Yellow 214 | 5 |
| 22 | Terephthalic acid (100) | Ethylene glycol (100) | Pigment Yellow 180 | 10 |
| 23 | Terephthalic acid (100) | Ethylene glycol (100) | Titanium dioxide | 10 |
| 24 | Terephthalic acid (88) Isophthalic acid (12) | Ethylene glycol (100) | Pigment Yellow 180 | 10 |
| 25 | Terephthalic acid (88) Isophthalic acid (12) | Ethylene glycol (100) | Pigment Yellow 214 | 5 |
| 26 | Terephthalic acid (88) Isophthalic acid (12) | Ethylene glycol (100) | Pigment Yellow 214 | 5 |

| | Can outer surface side: polyester film (b1) (lower layer) | Can outer surface side: polyester film (b2) (upper layer) | | |
|---|---|---|---|---|
| | | Resin type | | |
| No. | Thickness (μm) | Acid component | Glycol component | Thickness (μm) |
| 1 | 10.0 | Terephthalic acid (100) | Ethylene glycol (100) | 2.0 |
| 2 | 10.0 | Terephthalic acid (100) | Ethylene glycol (100) | 2.0 |
| 3 | 10.0 | Terephthalic acid (100) | Ethylene glycol (100) | 2.0 |
| 4 | 10.0 | Terephthalic acid (100) | Ethylene glycol (100) | 1.0 |
| 5 | 10.0 | Terephthalic acid (100) | Ethylene glycol (100) | 3.0 |
| 6 | 10.0 | Terephthalic acid (100) | Ethylene glycol (100) | 3.0 |
| 7 | 10.0 | Terephthalic acid (100) | Ethylene glycol (100) | 2.0 |
| 8 | 10.0 | Terephthalic acid (100) | Ethylene glycol (100) | 2.0 |
| 9 | 10.0 | Terephthalic acid (100) | Ethylene glycol (100) | 2.0 |
| 10 | 10.0 | Terephthalic acid (100) | Ethylene glycol (100) | 2.0 |
| 11 | 10.0 | Terephthalic acid (100) | Ethylene glycol (100) | 2.0 |
| 12 | 10.0 | Terephthalic acid (100) | Ethylene glycol (100) | 2.0 |
| 13 | 10.0 | Terephthalic acid (100) | Ethylene glycol (100) | 2.0 |
| 14 | 10.0 | Terephthalic acid (99) Isophthalic acid (1) | Ethylene glycol (100) | 2.0 |
| 15 | 10.0 | Terephthalic acid (100) | Ethylene glycol (100) | 2.0 |
| 16 | 11.0 | Terephthalic acid (90) Isophthalic acid (10) | Ethylene glycol (100) | 2.0 |
| 17 | 10.0 | Terephthalic acid (87) Isophthalic acid (13) | Ethylene glycol (100) | 3.0 |
| 18 | 10.0 | Terephthalic acid (100) | Ethylene glycol (100) | 3.0 |
| 19 | 10.0 | Terephthalic acid (100) | Ethylene glycol (100) | 3.0 |
| 20 | 10.0 | Terephthalic acid (100) | Ethylene glycol (100) | 3.0 |
| 21 | 12.0 | Terephthalic acid (100) | Ethylene glycol (100) | 1.0 |
| 22 | 12.0 | Terephthalic acid (100) | Ethylene glycol (100) | 1.0 |
| 23 | 10.0 | Terephthalic acid (100) | Ethylene glycol (100) | 3.0 |
| 24 | 10.0 | Terephthalic acid (88) Isophthalic acid (12) | Ethylene glycol (100) | 3.0 |

TABLE 2-continued

| | | | | |
|---|---|---|---|---|
| 25 | 10.0 | Terephthalic acid (100) | Ethylene glycol (100) | 3.0 |
| 26 | 10.0 | Terephthalic acid (100) | Ethylene glycol (100) | 3.0 |

*Content (mass %) in terms of percentage based on entire resin layer (B)

TABLE 3

| | Laminate production conditions | | | | | |
|---|---|---|---|---|---|---|
| | Before lamination | During lamination | | | After lamination | |
| No. | Surface temperature of film (° C.) | Surface temperature of metal sheet (° C.) | Surface temperature of lamination roller (° C.) | Time of contact with lamination roller (msec) | Time until quenching (sec) | Temperature of quenching water (° C.) |
| 1 | 140 | 263 | 90 | 15 | 1.0 | 70 |
| 2 | 140 | 269 | 100 | 15 | 1.0 | 70 |
| 3 | 160 | 262 | 130 | 11 | 2.5 | 70 |
| 4 | 140 | 261 | 90 | 15 | 1.0 | 70 |
| 5 | 145 | 260 | 100 | 15 | 1.0 | 70 |
| 6 | 140 | 253 | 85 | 16 | 1.0 | 70 |
| 7 | 120 | 247 | 80 | 20 | 0.9 | 70 |
| 8 | 140 | 277 | 100 | 15 | 1.0 | 70 |
| 9 | 145 | 280 | 110 | 15 | 1.0 | 70 |
| 10 | 140 | 263 | 90 | 15 | 1.0 | 70 |
| 11 | 140 | 263 | 90 | 15 | 1.0 | 70 |
| 12 | 140 | 269 | 105 | 15 | 1.0 | 70 |
| 13 | 140 | 263 | 90 | 15 | 1.0 | 70 |
| 14 | 140 | 263 | 90 | 15 | 1.0 | 70 |
| 15 | 140 | 269 | 100 | 15 | 1.0 | 70 |
| 16 | 145 | 260 | 100 | 15 | 1.0 | 70 |
| 17 | 160 | 262 | 100 | 15 | 1.0 | 70 |
| 18 | 120 | 267 | 75 | 20 | 0.9 | 70 |
| 19 | 140 | 261 | 90 | 15 | 1.0 | 70 |
| 20 | 140 | 277 | 105 | 13 | 1.0 | 70 |
| 21 | 140 | 263 | 90 | 15 | 1.0 | 70 |
| 22 | 150 | 296 | 120 | 12 | 2.0 | 70 |
| 23 | 140 | 242 | 130 | 12 | 1.5 | 70 |
| 24 | 140 | 269 | 100 | 15 | 1.0 | 70 |
| 25 | 140 | 261 | 90 | 15 | 1.0 | 70 |
| 26 | 140 | 277 | 100 | 15 | 1.0 | 70 |

(Evaluation of Resin-Coated Metal Sheet for Containers)
The following properties of the resin-coated metal sheet and the resin layers on the metal sheet, which were obtained as described above, were measured and evaluated. The measurement and evaluation methods are described below.

(1) Raman Band Intensity Ratio ($I_{1720}/I_{1615}$) (I) when Measured by Using Laser Polarization Plane Parallel to Surface of Resin Layer A sample to be measured was prepared by polishing the cross section of a laminate steel sheet. The Raman-band intensities at 1720 cm$^{-1}$ and 1615 cm$^{-1}$ on a laser polarization plane parallel to the surface of the resin layer to be located on the container inner surface side were measured in intervals of 1 μm in the thickness direction from the surface of the uppermost resin layer (a1). The ratio of the Raman-band intensity at 1720 cm$^{-1}$ to that at 1615 cm$^{-1}$ was obtained, and the maximum value and the mean value of this intensity ratio were obtained. The Raman band intensity at 1720 cm$^{-1}$ was obtained from the highest peak of the Raman band in the range of 1720 cm$^{-1}$+10 cm$^{-1}$. Similarly, the Raman band intensity at 1615 cm$^{-1}$ was obtained from the highest peak of the Raman band in the range of 1615 cm$^{-1}$+10 cm$^{-1}$. The Raman band intensity ratio (I) was calculated in accordance with the following formula.

$$I = I_{1720}/I_{1615}$$

$I_{1720}$: Raman band intensity at 1720 cm$^{-1}$
$I_{1650}$: Raman band intensity at 1615 cm$^{-1}$
Measurement Conditions
Excitation light source: Semiconductor laser (λ=530 nm)
Microscope magnification: 100×
Exposure time: 5 sec
Number of times of exposure: 2
Aperture: 25 μmφ

(2) Content Release Property
A laminate metal sheet was formed into a cup by using a drawing machine in the drawing process. In this case, the blank diameter was 100 mm, and the drawing ratio (diameter before forming/diameter after forming) was 1.88. The cup was then charged with salt-curing meat for luncheon meat (protein content in solid content: 60 mass %). After the can was sealed with a lid by seaming, a retort sterilization treatment (130° C. for 90 minutes) was performed. Subsequently, the cover was removed and the cup was inverted to take contents out. At this time, the content releasability was evaluated by determining the state of the contents left inside the cup.

(Criteria)
A: The contents can be taken out only by inverting the cup (without shaking the cup by hand). After the contents are taken out, few deposits are found on the inner surface of the cup as observed with the naked eye.
B: The contents still remain inside the cup even after the cup is only inverted. However, the contents can be taken out by shaking the cup up and down (through an action, such as shaking the cup by hand). After the contents are taken out, few deposits are found on the inner surface of the cup as observed with the naked eye.
D: Few contents are taken out only by shaking the cup up and down (through an action, such as shaking the cup by hand). After the speed at which the cup is shaken up and down is significantly increased or the contents are forcibly taken out by using an instrument, such as a spoon, some deposits are obviously found on the inner surface of the cup as observed with the naked eye.

(3) Formability

The resin-coated metal sheet was coated with a wax and then punched out in the form of a disk having a diameter of 165 mm, which was formed into a shallow-drawn can at a drawing ratio of 1.50. Next, this drawn can was redrawn at drawing ratios of 1.80 and 2.00. The obtained can was then subjected to doming according to an ordinary method, followed by trimming. The can was then subjected to neck-in and flange machining to form a deep-drawn can. The state of the processed film in the neck-in portion of the deep-drawn can thus obtained was examined by visual observation.

(Criteria)

A: The film has no defect after can formation.

B: The can can be formed but the film partially has discoloration.

D: The can body is damaged and the can cannot be formed.

(4) Retort-Blushing Resistance

The bottom (on the can outer surface side) of the cans of which the formability had been rated B or higher, which indicates that the can can be formed, in the formability evaluation (3) was targeted for evaluation. Each can was charged with tap water at room temperature and sealed with a lid by seaming. The can was then placed in a steam-type retort sterilization furnace with the can bottom facing downward, and a retort treatment at 130° C. for 90 minutes was performed on the can. After the treatment, the change in the appearance of the outer surface of the can bottom was observed.

(Criteria)

A: There is no change in appearance.

B: The appearance is slightly cloudy.

D: The appearance is whitish (whitening occurs).

(5) Pigment-Bleeding Resistance

The cans of which the formability had been rated B or higher, which indicates that the can can be formed, in the formability evaluation (3) were targeted for evaluation. Each can was charged with tap water at room temperature and then sealed with a cover by seaming. The can was then placed in a steam-type retort sterilization furnace, and a retort treatment at 130° C. for 90 minutes was performed on the can. After the treatment, the can body was wiped with a gauze, and whether the pigment bled out was evaluated.

(Criteria)

A: No pigment adhesion is found on the surface of the gauze with which the can body has been wiped, and no coloring is observed.

B: No pigment adhesion is found on the surface of the gauze with which the can body has been wiped as observed with the naked eye. However, pigment adhesion is slightly found as observed with an optical microscope (100×).

D: Pigment adhesion is found on the surface of the gauze with which the can body has been wiped, and coloring is observed.

(6) Adhesion after Formation

The cans of which the formability had been rated B or higher, which indicates that the can can be formed, in the formability evaluation (3) were targeted for evaluation. Each can was charged with a mixture of 3 mass % of NaCl and 3 mass % of sodium citrate, and then sealed with a cover by seaming. The can was then subjected to a retort sterilization treatment at 130° C. for 90 minutes, and allowed to stand in a thermostatic bath at 38° C. for 90 days. The can was then cut open, and a sample (15 mm in width and 120 mm in length) for peel testing was cut out from the can body. A part of the film was peeled from the longer-side end of the cut sample. Peel testing was performed by opening the peeled film in the direction opposite the peeling direction (angle: 180°) with a tensile testing machine at a tension rate of 30 mm/min, and the adhesion strength over a width of 15 mm was evaluated. The can body of the internal surface is targeted for evaluation.

(Criteria)

A: 10.0 (N) or more

B: 5.0 (N) or more and less than 10.0 (N)

D: less than 5.0 (N)

(7) Corrosion Resistance

The cans of which the formability had been rated B or higher, which indicates that the can can be formed, in the formability evaluation (3) were targeted for evaluation. Each can was charged with commercially available ketchup (available from Kagome Co., Ltd.), and then sealed with a cover by seaming. The can was then subjected to a retort sterilization treatment at 130° C. for 90 minutes, and allowed to stand in a thermostatic bath at 38° C. for 90 days. Subsequently, the concentration of iron released to the contents (ketchup) was measured, and the corrosion resistance was evaluated. The can body of the internal surface is targeted for evaluation.

(Criteria)

A: less than 1 mass ppm

B: 1 mass ppm or more and less than 10 mass ppm

D: 10 mass ppm or more (8) Scratch Resistance During Forming

The resin-coated metal sheet was coated with a wax and punched out in the form of a disk having a diameter of 179 mm, which was formed into a shallow-drawn can at a drawing ratio of 1.80. Next, this drawn can was redrawn at drawing ratios of 2.40 and 3.00 to form a deep-drawn can. The state of the processed film in the can body of the deep-drawn can thus obtained was examined by visual observation.

(Criteria)

A: The film has no defect after can formation.

B: The can can be formed but the film partially has a few flaws.

C: The can can be formed but the film has scratches and the steel plate is partially exposed.

D: The can body is damaged and the can cannot be formed.

(9) Printability

A printing ink (printing ink CCST 39 available from Toyo Ink Co., Ltd.) was applied to the resin surface that was to be located on the container outer surface side after the resin-coated metal sheet was formed into a container. The printing ink was dried to a coating thickness of 1.5 µm. Subsequently, a strip of Sellotape (registered trademark) available from Nichiban Co., Ltd. was stuck to the coated surface and peeled off at a time.

The test was performed by using ten strips, and the number of strips until the ink was peeled off was examined.

B: 0 strips

C: 1 to 3 strips

D: 4 strips or more

The results obtained above are shown in Tables 4 and 5.

TABLE 4

Results of Performance Evaluation on Can Inner Surface Side

| No. | Content release property | Form-ability | Adhesion after forming | Corrosion Resistance | Note |
|---|---|---|---|---|---|
| 1 | A | A | A | A | Invention Example |
| 2 | A | A | A | A | Invention Example |
| 3 | A | A | A | A | Invention Example |
| 4 | A | A | A | A | Invention Example |
| 5 | A | A | A | A | Invention Example |
| 6 | A | A | A | A | Invention Example |
| 7 | B | B | B | A | Invention Example |
| 8 | A | A | A | A | Invention Example |
| 9 | A | A | A | B | Invention Example |
| 10 | B | A | A | A | Invention Example |
| 11 | A | A | B | B | Invention Example |
| 12 | B | A | A | A | Invention Example |
| 13 | A | B | B | B | Invention Example |
| 14 | B | A | A | A | Invention Example |
| 15 | B | A | A | A | Invention Example |
| 16 | A | A | B | B | Invention Example |
| 17 | A | A | B | B | Invention Example |
| 18 | A | A | B | B | Invention Example |
| 19 | A | A | A | A | Invention Example |
| 20 | A | A | A | A | Invention Example |
| 21 | D | A | A | A | Comparative Example |
| 22 | A | A | D | D | Comparative Example |
| 23 | D | D | — | — | Comparative Example |
| 24 | D | A | A | A | Comparative Example |
| 25 | A | B | D | D | Comparative Example |
| 26 | A | B | D | D | Comparative Example |

TABLE 5

Results of Performance Evaluation on Can Outer Surface Side

| No. | Retort-blushing resistance | Pigment-bleeding resistance | Scratch resistance | Print-ability | Note |
|---|---|---|---|---|---|
| 1 | A | A | B | B | Invention Example |
| 2 | A | A | B | B | Invention Example |
| 3 | A | A | B | B | Invention Example |
| 4 | A | B | B | B | Invention Example |
| 5 | A | A | B | B | Invention Example |
| 6 | A | A | B | B | Invention Example |
| 7 | A | A | B | B | Invention Example |
| 8 | A | A | B | B | Invention Example |
| 9 | A | A | B | B | Invention Example |
| 10 | A | A | B | B | Invention Example |
| 11 | A | A | B | B | Invention Example |
| 12 | A | A | B | B | Invention Example |
| 13 | A | A | B | B | Invention Example |
| 14 | A | A | B | B | Invention Example |
| 15 | A | A | B | B | Invention Example |
| 16 | A | A | B | B | Invention Example |
| 17 | A | A | B | B | Invention Example |
| 18 | A | A | B | B | Invention Example |
| 19 | A | A | B | B | Invention Example |
| 20 | A | A | B | B | Invention Example |
| 21 | B | B | B | B | Comparative Example |
| 22 | B | B | B | B | Comparative Example |
| 23 | — | — | — | — | Comparative Example |
| 24 | B | A | B | B | Comparative Example |
| 25 | B | A | B | B | Comparative Example |
| 26 | B | A | B | B | Comparative Example |

As shown in Tables 4 and 5, the content release property and other properties of Invention Examples within the scope of the present invention are good. In contrast, any of properties, such as content release property, of Comparative Examples out of the scope of the present invention is poor.

Example 2

(Method for Manufacturing Metal Sheet)
A metal sheet was produced in the same method as that in Example 1.

(Method for Manufacturing Resin Coating Film to be Located on Container Inner Surface Side)
The acid component and the glycol component shown in Table 6 were copolymerized such that all acid copolymer components other than terephthalic acid were polymerized with ethylene glycol to provide polyethylene terephthalate or a polyethylene terephthalate copolymer, which was further mixed with polybutylene terephthalate obtained by polymerization of terephthalic acid and butylene glycol, providing a polyester resin. This polyester resin was mixed with a wax compound to provide a resin composition. The resin composition was dried and melted in accordance with an ordinary method and coextruded from a T-die. The obtained product was then solidified by cooling on a cooling drum to provide an unstretched film. The unstretched film was biaxially stretched and thermally set to provide a biaxially stretched polyester film (A).

(Method for Manufacturing Resin Coating Film to be Located on Container Outer Surface Side)
A polyester resin obtained by polymerization of the acid component and the glycol components shown in Table 7 was mixed with a color pigment and a wax compound in the ratio shown in Table 7 to provide a resin composition. The resin composition was dried and melted in accordance with an ordinary method and coextruded from a T-die. The obtained product was then solidified by cooling on a cooling drum to provide an unstretched film. The unstretched film was biaxially stretched and thermally set to provide a biaxially stretched polyester film (B).

(Method for Manufacturing Resin-Coated Metal Sheet for Containers)
A chromium-coated steel sheet 1 obtained above was heated with a metal-belt heating device 2 in a metal-belt lamination apparatus shown in FIG. 1. A polyester film (A), which was to be located on the container inner surface side after container formation, was laminated on (thermally fusion-bonded to) one surface of the chromium-coated steel plate 1 by using a lamination roller 3, while a polyester film (B), which was to be located on the container outer surface side, was laminated on (thermally fusion-bonded to) the other surface of the chromium-coated steel sheet 1. When the polyester film (A) was laminated on the metal sheet, the surface temperature of the metal sheet was controlled in the range from Tm to Tm+40° C. of the polyester resin layer (a1) contained in the polyester film (A) in Examples except for some Comparative Examples. The surface temperature of lamination rollers 3 was controlled in the range from Tg to Tg+60° C. of the polyester film (A). The time of contact with the metal sheet was controlled in the range from 10 to 15 msec. The resins described in Table 1 have substantially the same Tg, which was about 75° C. The lamination rollers 3 used an internal water cooling system. Temperature control was performed during the bonding of the films by circulating cooling water in the rollers. The temperature of the resin layer before lamination was controlled in the range from Tg+30° C. to Tg+100° C. of the polyester film (A), which made uniform the temperature distribution in the cross section of the resin layer. Subsequently, cooling with water was performed in a metal-belt cooling device 5, and a resin-coated metal sheet for containers was produced accordingly. The production conditions are shown in Table 8.

The cross-sectional structure of the resin-coated metal sheet for containers produced as described above is shown in FIG. 2.

TABLE 6

| | Can inner surface side: polyester film (a1) (upper layer) | | | | | | | |
|---|---|---|---|---|---|---|---|---|
| | Resin type | | Wax compound | | Raman band peak intensity ratio ($I_{1720}/I_{1615}$) | | | Melting |
| No. | Acid component | Glycol component | Type | Content (mass %) | Maximum value | Mean value | Thickness (μm) | point (° C.) |
| 27 | Terephthalic acid (100) | Ethylene glycol (100) | Carnauba wax | 0.80 | 0.62 | 0.58 | 3.0 | 255 |
| 28 | Terephthalic acid (100) | Ethylene glycol (100) | Carnauba wax | 0.80 | 0.62 | 0.58 | 3.0 | 255 |
| 29 | Terephthalic acid (100) | Ethylene glycol (100) | Carnauba wax | 0.80 | 0.62 | 0.58 | 3.0 | 255 |
| 30 | Terephthalic acid (100) | Ethylene glycol (100) | Carnauba wax | 0.80 | 0.62 | 0.58 | 3.0 | 255 |
| 31 | Terephthalic acid (100) | Ethylene glycol (100) | Carnauba wax | 0.80 | 0.48 | 0.44 | 3.0 | 255 |
| 32 | Terephthalic acid (100) | Ethylene glycol (100) | Carnauba wax | 0.80 | 0.48 | 0.44 | 3.0 | 255 |
| 33 | Terephthalic acid (100) | Ethylene glycol (100) | Carnauba wax | 0.80 | 0.48 | 0.44 | 3.0 | 255 |
| 34 | Terephthalic acid (100) | Ethylene glycol (100) | Carnauba wax | 0.80 | 0.48 | 0.44 | 3.0 | 255 |
| 35 | Terephthalic acid (100) | Ethylene glycol (100) | Polyethylene wax | 1.00 | 0.48 | 0.44 | 3.0 | 255 |
| 36 | Terephthalic acid (100) | Ethylene glycol (100) | Carnauba wax | 0.70 | 0.62 | 0.58 | 8.0 | 255 |
| 37 | Terephthalic acid (100) | Ethylene glycol (100) | Carnauba wax | 0.80 | 0.78 | 0.72 | 3.0 | 255 |
| 38 | Terephthalic acid (100) | Ethylene glycol (100) | Carnauba wax | 0.80 | 0.78 | 0.72 | 3.0 | 255 |
| 39 | Terephthalic acid (100) | Ethylene glycol (100) | Carnauba wax | 0.80 | 0.62 | 0.58 | 3.0 | 255 |
| 40 | Terephthalic acid (100) | Ethylene glycol (100) | Carnauba wax | 0.80 | 0.62 | 0.58 | 3.0 | 255 |

| | Can inner surface side: polyester film (a2) (lower layer) | | | | Wax compound content |
|---|---|---|---|---|---|
| | Resin type | | Thickness | Melting point | based on entire layer |
| No. | Acid component | Glycol component | (μm) | (° C.) | (mass %) |
| 27 | Terephthalic acid (100) | Ethylene glycol (100) | 12.0 | 255 | 0.16 |
| 28 | Terephthalic acid (100) | Ethylene glycol (100) | 12.0 | 255 | 0.16 |
| 29 | Terephthalic acid (100) | Ethylene glycol (100) | 12.0 | 255 | 0.16 |
| 30 | Terephthalic acid (100) | Ethylene glycol (100) | 12.0 | 255 | 0.16 |
| 31 | Terephthalic acid (100) | Ethylene glycol (100) | 12.0 | 255 | 0.16 |
| 32 | Terephthalic acid (100) | Ethylene glycol (100) | 12.0 | 255 | 0.16 |
| 33 | Terephthalic acid (100) | Ethylene glycol (100) | 12.0 | 255 | 0.16 |
| 34 | Terephthalic acid (100) | Ethylene glycol (100) | 12.0 | 255 | 0.16 |
| 35 | Terephthalic acid (100) | Ethylene glycol (100) | 12.0 | 255 | 0.20 |

TABLE 6-continued

| No. | Acid component | Glycol component | | | |
|---|---|---|---|---|---|
| 36 | Terephthalic acid (100) | Ethylene glycol (100) | 7.0 | 255 | 0.37 |
| 37 | Terephthalic acid (100) | Ethylene glycol (100) | 12.0 | 255 | 0.16 |
| 38 | Terephthalic acid (100) | Ethylene glycol (100) | 12.0 | 255 | 0.16 |
| 39 | Terephthalic acid (100) | Ethylene glycol (100) | 12.0 | 255 | 0.16 |
| 40 | Terephthalic acid (100) | Ethylene glycol (100) | 12.0 | 255 | 0.16 |

*) Specific melting point is not detected.

TABLE 7

Can outer surface side: polyester film (b1) (lower layer)

| | Resin type | | Color pigment | | Wax compound | | |
|---|---|---|---|---|---|---|---|
| No. | Acid component | Glycol component | Type | Content (mass %)* | Type | Content (mass %)** | Thickness (μm) |
| 27 | Terephthalic acid (100) | Ethylene glycol (50) Butylene glycol (50) | Pigment Yellow 180 | 5 | — | 0.00 | 10.0 |
| 28 | Terephthalic acid (100) | Ethylene glycol (50) Butylene glycol (50) | Pigment Yellow 180 | 5 | — | 0.00 | 10.0 |
| 29 | Terephthalic acid (100) | Ethylene glycol (50) Butylene glycol (50) | Pigment Yellow 180 | 5 | — | 0.00 | 10.0 |
| 30 | Terephthalic acid (100) | Ethylene glycol (50) Butylene glycol (50) | Pigment Yellow 180 | 5 | — | 0.00 | 10.0 |
| 31 | Terephthalic acid (100) | Ethylene glycol (40) Butylene glycol (60) | Pigment Yellow 180 | 5 | — | 0.00 | 10.0 |
| 32 | Terephthalic acid (100) | Ethylene glycol (40) Butylene glycol (60) | Pigment Yellow 180 | 5 | — | 0.00 | 10.0 |
| 33 | Terephthalic acid (100) | Ethylene glycol (40) Butylene glycol (60) | Pigment Yellow 180 | 5 | — | 0.00 | 10.0 |
| 34 | Terephthalic acid (100) | Ethylene glycol (40) Butylene glycol (60) | Pigment Yellow 180 | 5 | — | 0.00 | 10.0 |
| 35 | Terephthalic acid (100) | Ethylene glycol (40) Butylene glycol (60) | Pigment Yellow 180 | 5 | — | 0.00 | 10.0 |
| 36 | Terephthalic acid (100) | Ethylene glycol (50) Butylene glycol (50) | Titanium dioxide | 15 | — | 0.00 | 10.0 |
| 37 | Terephthalic acid (100) | Ethylene glycol (50) Butylene glycol (50) | Pigment Yellow 180 | 10 | Carnauba wax | 1.00 | 10.0 |
| 38 | Terephthalic acid (100) | Ethylene glycol (50) Butylene glycol (50) | Pigment Yellow 180 | 10 | Polyethylene wax | 1.00 | 10.0 |
| 39 | Terephthalic acid (100) | Ethylene glycol (50) Butylene glycol (50) | Pigment Yellow 180 | 5 | — | 0.00 | 10.0 |
| 40 | Terephthalic acid (100) | Ethylene glycol (48) Cyclohexanedimethanol (2) Butylene glycol (50) | Pigment Yellow 180 | 5 | — | 0.00 | 10.0 |

| | Can outer surface side: polyester film (b2) (upper layer) | | | | | Wax compound content based on entire layer (mass %) |
|---|---|---|---|---|---|---|
| | Resin type | | Wax compound | | | |
| No. | Acid component | Glycol component | Type | Content (mass %) | Thickness (μm) | |
| 27 | Terephthalic acid (100) | Ethylene glycol (100) | Carnauba wax | 0.1 | 2.0 | 0.02 |
| 28 | Terephthalic acid (100) | Ethylene glycol (100) | Carnauba wax | 1.0 | 2.0 | 0.17 |
| 29 | Terephthalic acid (100) | Ethylene glycol (100) | Carnauba wax | 2.0 | 2.0 | 0.33 |
| 30 | Terephthalic acid (100) | Ethylene glycol (100) | Carnauba wax | 5.0 | 2.0 | 0.83 |
| 31 | Terephthalic acid (100) | Ethylene glycol (100) | Polyethylene wax | 0.1 | 2.0 | 0.02 |
| 32 | Terephthalic acid (100) | Ethylene glycol (100) | Polyethylene wax | 1.0 | 2.0 | 0.17 |
| 33 | Terephthalic acid (100) | Ethylene glycol (100) | Polyethylene wax | 2.0 | 2.0 | 0.33 |
| 34 | Terephthalic acid (100) | Ethylene glycol (100) | Polyethylene wax | 5.0 | 2.0 | 0.83 |
| 35 | Terephthalic acid (100) | Ethylene glycol (100) | Polyethylene wax | 1.0 | 2.0 | 0.17 |

TABLE 7-continued

| | | | | | | | |
|---|---|---|---|---|---|---|---|
| | 36 | Terephthalic acid (100) | Ethylene glycol (100) | Polypropylene wax | 0.5 | 2.0 | 0.08 |
| | 37 | Terephthalic acid (100) | Ethylene glycol (100) | Carnauba wax | 1.0 | 2.0 | 1.00 |
| | 38 | Terephthalic acid (100) | Ethylene glycol (100) | Polyethylene wax | 1.0 | 2.0 | 1.00 |
| | 39 | Terephthalic acid (100) | Ethylene glycol (100) | Carnauba wax | 5.5 | 2.0 | 0.92 |
| | 40 | Terephthalic acid (100) | Ethylene glycol (100) | Carnauba wax | 0.1 | 2.0 | 0.02 |

*Content (mass %) in terms of percentage based on entire resin layer (B)
**Content (mass %) in terms of percentage based on lower resin layer (b1)

TABLE 8

| | Laminate production conditions | | | | | |
|---|---|---|---|---|---|---|
| | Before lamination | During lamination | | | After lamination | |
| No. | Surface temperature of film (° C.) | Surface temperature of metal sheet (° C.) | Surface temperature of lamination roller (° C.) | Time of contact with lamination roller (msec) | Time until quenching (sec) | Temperature of quenching water (° C.) |
| 27 | 140 | 263 | 90 | 15 | 1.0 | 70 |
| 28 | 140 | 263 | 90 | 15 | 1.0 | 70 |
| 29 | 140 | 263 | 90 | 15 | 1.0 | 70 |
| 30 | 140 | 263 | 90 | 15 | 1.0 | 70 |
| 31 | 145 | 280 | 110 | 15 | 1.0 | 70 |
| 32 | 140 | 277 | 100 | 15 | 1.0 | 70 |
| 33 | 140 | 277 | 100 | 15 | 1.0 | 70 |
| 34 | 140 | 277 | 100 | 15 | 1.0 | 70 |
| 35 | 140 | 277 | 100 | 15 | 1.0 | 70 |
| 36 | 140 | 263 | 90 | 15 | 1.0 | 70 |
| 37 | 120 | 247 | 80 | 20 | 0.9 | 70 |
| 38 | 120 | 247 | 80 | 20 | 0.9 | 70 |
| 39 | 140 | 263 | 90 | 15 | 1.0 | 70 |
| 40 | 140 | 263 | 90 | 15 | 1.0 | 70 |

(Evaluation of Resin-Coated Metal Sheet for Containers)

The following properties of the resin-coated metal sheet and the resin layer on the metal sheet, which were obtained as described above, were measured and evaluated. The measurement and evaluation methods are the same as those in Example 1.

(1) Raman Band Intensity Ratio ($I_{1720}/I_{1615}$) (I) When Measured by Using Laser Polarization Plane Parallel to Surface of Resin Layer
(2) Content Release Property
(3) Formability
(4) Retort-blushing Resistance
(5) Pigment-Bleeding Resistance
(6) Adhesion after Formation
(7) Corrosion Resistance
(8) Scratch Resistance during Formation Processing
(9) Printability The results obtained above are shown in Tables 9 and 10.

TABLE 9

| Results of Performance Evaluation on Can Inner Surface Side | | | | | |
|---|---|---|---|---|---|
| No. | Content release property | Formability | Adhesion after forming | Corrosion Resistance | Note |
| 27 | A | A | A | A | Invention Example |
| 28 | A | A | A | A | Invention Example |
| 29 | A | A | A | A | Invention Example |
| 30 | A | A | A | A | Invention Example |
| 31 | A | A | A | A | Invention Example |
| 32 | A | A | A | A | Invention Example |
| 33 | A | A | A | A | Invention Example |
| 34 | A | A | A | A | Invention Example |
| 35 | A | A | A | A | Invention Example |
| 36 | A | B | B | B | Invention Example |
| 37 | B | B | B | A | Invention Example |
| 38 | B | B | B | A | Invention Example |
| 39 | A | A | A | A | Invention Example |
| 40 | A | A | A | A | Invention Example |

TABLE 10

| Results of Performance Evaluation on Can Outer Surface Side | | | | | |
|---|---|---|---|---|---|
| No. | Retort-blushing resistance | Pigment-bleeding resistance | Scratch resistance | Printability | Note |
| 27 | A | A | A | B | Invention Example |
| 28 | A | A | A | B | Invention Example |
| 29 | A | A | A | B | Invention Example |
| 30 | A | A | A | B | Invention Example |

TABLE 10-continued

Results of Performance Evaluation on Can Outer Surface Side

| No. | Retort-blushing resistance | Pigment-bleeding resistance | Scratch resistance | Print-ability | Note |
|---|---|---|---|---|---|
| 31 | A | A | A | B | Invention Example |
| 32 | A | A | A | B | Invention Example |
| 33 | A | A | A | B | Invention Example |
| 34 | A | A | A | B | Invention Example |
| 35 | A | A | A | B | Invention Example |
| 36 | A | A | A | B | Invention Example |
| 37 | A | A | A | B | Invention Example |
| 38 | A | A | A | B | Invention Example |
| 39 | B | A | A | C | Invention Example |
| 40 | A | A | A | B | Invention Example |

As shown in Tables 9 and 10, the content release property and other properties of Invention Examples within the scope of the present invention are good. In particular, Examples 27 to 38 and 40 containing an appropriate amount of the wax in the resin layer to be located on the container outer surface side have better scratch resistance. Example 39 is an example of the present invention in which the amount of the wax in the resin layer to be located on the container outer surface side is beyond the suitable range. Example 39 has printability slightly lower than that of Examples 27 to 38 and 40 although there is no problem in use.

The resin-coated metal sheet for containers according to the present invention is suitable in container applications and packaging applications that require a good content release property. The resin-coated metal sheet for containers can be used as a container material that will undergo drawing or the like, particularly a material for food can containers.

REFERENCE SIGNS LIST

1 Metal sheet (chromium-coated steel plate)
2 Metal-belt heating device
3 Lamination roller
4a Polyester resin layer (A)
4b Polyester resin layer (B)
5 Metal-belt cooling device

The invention claimed is:

1. A resin-coated metal sheet for a container, comprising a metal sheet and a resin layer (A) having a multi-layer structure containing polyester as a main component on an inner-surface side of the container when the metal sheet is formed into a container, wherein
1) the resin layer (A) contains terephthalic acid in an amount of 85 mol % or more,
2) the resin layer (A) has at least two layers including an uppermost resin layer (a1) which comes in contact with contents and contains wax compound in an amount of 0.10 to 2.0 mass % with respect to the uppermost resin layer (a1), the wax compound containing carnauba wax;
3) a maximum value of a Raman band intensity ratio ($I_{1723}/I_{1615}$) when measured for a cross section of the uppermost resin layer (a1) by using a laser polarization plane parallel to a surface of the resin layer (a1) is in a range of 0.45 or more and 0.80 or less;
4) the uppermost resin layer (a1) has a thickness of 0.5 μm or more and 10 μm or less; and
5) the resin layer (A) excluding the uppermost resin layer (a1) has a thickness of 5 μm or more and 20 μm or less.

2. The resin-coated metal sheet for a container according to claim 1, further comprising a resin layer (B) having a multi-layer structure containing polyester as a main component on an outer-surface side of container when the metal sheet is formed into the container,
wherein a resin layer (b1), which is the resin layer (B) excluding an uppermost layer, contains titanium dioxide or a disazo organic pigment as a color pigment.

3. The resin-coated metal sheet for a container according to claim 2, wherein
a resin in the resin layer (b1) is a composition derived by mixing a polyester (1) containing polyethylene terephthalate or copolymerized polyethylene terephthalate containing less than 6 mol % of copolymerization components and a polyester (2) containing polybutylene terephthalate or copolymerized polybutylene terephthalate containing less than 5 mol % of copolymerization components,
and
a content of the polyester (1) is 60 mass % or less and a content of the polyester (2) is 40 mass % or more.

4. The resin-coated metal sheet for containers according to claim 3, wherein the resin layer (B) contains 5.0 mass % or less of a wax compound with respect to the resin layer (B).

5. The resin-coated metal sheet for containers according to claim 2, wherein the resin layer (B) contains 5.0 mass % or less of a wax compound with respect to the resin layer (B).

6. The resin-coated metal sheet for containers according to claim 5, wherein the wax compound contains carnauba wax.

7. The resin-coated metal sheet for containers according to claim 5, wherein
an uppermost resin layer (b2) and the resin layer (b1), which is the resin layer (B) excluding the uppermost layer, or the uppermost resin layer (b2) in the resin layer (B) contains the wax compound; and
the uppermost resin layer (b2) contains 5.0 mass % or less of the wax compound with respect to the uppermost resin layer (b2).

8. The resin-coated metal sheet for containers according to claim 7, wherein the wax compound contains carnauba wax.

9. A method for manufacturing the resin-coated metal sheet for containers according to claim 1, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

10. A method for manufacturing the resin-coated metal sheet for containers according to claim 2, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

11. A method for manufacturing the resin-coated metal sheet for containers according to claim 3, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

12. A method for manufacturing the resin-coated metal sheet for containers according to claim 5, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

13. A method for manufacturing the resin-coated metal sheet for containers according to claim 6, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

14. A method for manufacturing the resin-coated metal sheet for containers according to claim 7, comprising determining resin layer forming conditions such that a maximum value of a Raman band intensity ratio ($I_{1720}/I_{1615}$) when measured for a cross section of an uppermost resin layer (a1) by using a laser polarization plane parallel to a surface of the resin layer (a1) is in a range of 0.45 or more and 0.80 or less.

* * * * *

UNITED STATES PATENT AND TRADEMARK OFFICE
CERTIFICATE OF CORRECTION

PATENT NO. : 9,993,998 B2
APPLICATION NO. : 15/117877
DATED : June 12, 2018
INVENTOR(S) : Yoichiro Yamanaka et al.

It is certified that error appears in the above-identified patent and that said Letters Patent is hereby corrected as shown below:

In the Claims

At Column 31, Line 60, --($I_{1723}/I_{1615}$) when measured for a cross section of the-- should read "($I_{1720}/I_{1615}$) when measured for a cross section of the"

Signed and Sealed this
Fifth Day of November, 2019

Andrei Iancu
*Director of the United States Patent and Trademark Office*